(12) United States Patent
Miyajima et al.

(10) Patent No.: US 9,031,711 B2
(45) Date of Patent: May 12, 2015

(54) ALTITUDE RELIABILITY DETERMINING SYSTEM, DATA MAINTENANCE SYSTEM, DRIVING ASSISTANCE SYSTEM, ALTITUDE RELIABILITY DETERMINING PROGRAM, AND METHOD

(71) Applicants: Takayuki Miyajima, Anjo (JP); Yuichi Kuriwaki, Anjo (JP)

(72) Inventors: Takayuki Miyajima, Anjo (JP); Yuichi Kuriwaki, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 146 days.

(21) Appl. No.: 13/712,348

(22) Filed: Dec. 12, 2012

(65) Prior Publication Data

US 2013/0151033 A1 Jun. 13, 2013

(30) Foreign Application Priority Data

Dec. 13, 2011 (JP) ................................. 2011-272524

(51) Int. Cl.
*G01C 21/32* (2006.01)
*G06N 5/02* (2006.01)
*G01C 21/30* (2006.01)

(52) U.S. Cl.
CPC *G06N 5/02* (2013.01); *G01C 21/30* (2013.01); *G01C 21/32* (2013.01)

(58) Field of Classification Search
CPC .. B64C 2201/123; G01C 21/30; G01C 21/32; G01C 7/00; G01C 7/02; G06T 2207/30188
USPC ......... 701/408, 409, 411, 436, 439, 448, 450, 701/454, 458, 461, 495, 518
See application file for complete search history.

(56) References Cited

U.S. PATENT DOCUMENTS

| 2004/0027344 | A1* | 2/2004 | Ohto ............................. 345/419 |
| 2008/0004799 | A1* | 1/2008 | Takahashi ..................... 701/208 |
| 2009/0265070 | A1 | 10/2009 | Okada et al. |
| 2009/0297049 | A1* | 12/2009 | Garten et al. ................. 382/225 |
| 2010/0114474 | A1* | 5/2010 | Suganuma et al. ........... 701/200 |

FOREIGN PATENT DOCUMENTS

| JP | 2003-287422 A | 10/2003 |
| JP | 2004-046746 A | 2/2004 |
| JP | 2004037141 A * | 2/2004 ............. G01C 21/00 |
| JP | A-2004-037141 | 5/2004 |
| JP | 2007-305079 A | 11/2007 |

* cited by examiner

*Primary Examiner* — John R Olszewski
*Assistant Examiner* — Gerrad A Foster
(74) *Attorney, Agent, or Firm* — Oliff PLC

(57) ABSTRACT

Systems, methods, and programs acquire map information including road width data and background type data. The systems, methods, and programs acquire altitude information indicating an altitude of each unit region, the unit region being set by dividing a map indicated in the map information into a plurality of unit regions having a predetermined size, and calculate a predicted altitude of each of a plurality of reference points based on the road information and the altitude information, the plurality of reference points being set along a road. The systems, methods, and programs determine a predicted altitude reliability of each of the reference points based on at least one of the background type data and the road width data at the position of the each of the reference points.

13 Claims, 9 Drawing Sheets

FIG. 8

| PREDICTED ALTITUDE RELIABILITY C | GUIDANCE ASSISTANCE PROCESS AP1 | DRIVING CONTROL ASSISTANCE PROCESS AP2a(AP2) | SAFE CONTROL ASSISTANCE PROCESS AP2b(AP2) |
|---|---|---|---|
| 0~A2 | × | × | × |
| A2~A3 | ○ | × | × |
| A3~A4 | ○ | ○ | × |
| A4~100 | ○ | ○ | ○ |

US 9,031,711 B2

ALTITUDE RELIABILITY DETERMINING SYSTEM, DATA MAINTENANCE SYSTEM, DRIVING ASSISTANCE SYSTEM, ALTITUDE RELIABILITY DETERMINING PROGRAM, AND METHOD

INCORPORATION BY REFERENCE

The disclosure of Japanese Patent Application No. 2011-272524, filed on Dec. 13, 2011, including the specification, drawings, and abstract thereof, is incorporated herein by reference in its entirety.

BACKGROUND

1. Related Technical Fields

Related technical fields include altitude reliability determining systems that determine a reliability of a predicted altitude calculated based on road information and altitude information, as well as data maintenance systems and driving assistance systems using the altitude reliability determining systems. In addition, related technical fields include altitude reliability determining programs and methods that determine a reliability of a predicted altitude calculated based on road information and altitude information.

2. Related Art

Driving assistance systems are known, which are configured to determine control property of a vehicle and provide a driver with future information of the vehicle according to altitudes of road surface at a plurality of points on a road. For example, the system disclosed by Japanese Patent Application; Publication No. JP-A-2004-037141 is configured to be able to calculate a predicted altitude based on altitude information (mesh altitude data) provided from the Geographical Survey Institute and road information stored in a map database and execute various kinds of driving assistance processes according to the calculated predicted altitude. In the system of Japanese Patent Application; Publication No. JP-A-2004-037141, in view of the fact that it is difficult to accurately predict road surface altitudes for roads inside tunnels and the like, weighting of predicted altitudes at such points are decreased when calculating interpolating altitude values based on the predicted altitudes at a plurality of points.

Altitude information provided from the Geographical Survey Institute is created based on image information acquired by aerial photographing. Therefore, there are cases, in which an actual altitude (a real altitude) of ground surface differ from the altitude included in the altitude information, depending on the environment in the vicinity of the road even outside a tunnel. For example, in a wooded area, the altitude included in the altitude information may be the altitude of trees instead of the real altitude. The system of the Japanese Patent Application; Publication No. JP-A-2004-037141 does not consider such fact at all. Therefore, the reliabilities of predicted altitudes are not evaluated properly for roads constructed in a wood area. As a result, for roads constructed in areas belonging to specific attributes such as forest zones, the predicted altitudes cannot be calculated with high accuracy. Therefore, there have been cases in which a driving assistance process cannot be executed appropriately.

SUMMARY

Therefore, there is a demand to realize an altitude reliability determining system, in which the predicted altitude reliabilities that are reliabilities of predicted altitudes can be properly determined independently of the attributes of regions where roads are constructed. In addition, there is a demand to realize a data maintenance system, in which the predicted altitudes stored in association with map information can be properly corrected based on the properly determined predicted altitude reliabilities. Further, there is a demand to realize a driving assistance system, in which various kinds of driving assistance processes can be properly executed based on the properly determined predicted altitude reliabilities.

Exemplary implementations of the broad inventive principles described herein provide systems, methods, and programs that acquire map information including road width data and background type data. The systems, methods, and programs acquire altitude information indicating an altitude of each unit region, the unit region being set by dividing a map indicated in the map information into a plurality of unit regions having a predetermined size, and calculate a predicted altitude of each of a plurality of reference points based on the road information and the altitude information, the plurality of reference points being set along a road. The systems, methods, and programs determine a predicted altitude reliability of each of the reference points based on at least one of the background type data and the road width data at the position of the each of the reference points.

BRIEF DESCRIPTION OF THE DRAWINGS

FIG. 8 is a table showing relation between the predicted altitude reliability and executable various kinds of assistance processes.

DETAILED DESCRIPTION OF EXEMPLARY IMPLEMENTATIONS

An example of an altitude reliability determining system is described in conjunction with the accompanying drawings. An altitude reliability determining system 1 according to the present example is a system to determine predicted altitude reliabilities C, which are reliabilities of predicted altitudes h calculated based on road information R and altitude information H. In the present example, a case is exemplified, in which the altitude reliability determining system 1 is applied to a data maintenance system 2 that corrects the predicted altitudes h and stores them in a map database 6 and a driving assistance system 3 that executes various kinds of assistance processes AP regarding driving of a vehicle. In the present example, the respective systems are a part of a navigation system. In addition, the respective systems include a plurality of function parts. However, the respective function parts may be used in common by the plurality of systems.

The respective function parts of the altitude reliability determining system 1, the data maintenance system 2, and the driving assistance system 3 are functional portions for applying various kinds of processes to inputted data, which are mounted as hardware or software (program) stored in one or more computer-readable storage mediums, or as hardware and software, and executed by one or more controllers (e.g., an arithmetic processing device such as a CPU as a core member), which is common or independent to the function parts. In addition, the respective function parts are configured to be able to transmit and receive information through a communication line each other. (Note: the term "storage medium" as used herein is not intended to encompass transitory signals.)

For simple explanation, the example is described under the assumption that all of the altitude reliability determining system 1, the data maintenance system 2, and the driving assistance system 3 are installed in a single vehicle. However, the example is not limited to such structure. At least one of the respective function parts composing the aforementioned systems may be separately provided in a controller and an in-vehicle terminal device, which are able to communicate each other. That is, a so-called probe-car system may be structured by the controller and a plurality of in-vehicle terminal devices provided so as to be able to communicate with the controller. In such case, the respective in-vehicle terminal devices may be structured to provide information of the predicted altitude reliabilities C and/or corrected predicted altitudes h' as probe information. In addition, the altitude reliability determining system 1 and the data maintenance system 2 may be provided in the controller, and the altitude reliability determining system 1 and the driving assistance system 3 be provided in the in-vehicle terminal devices.

1. Altitude Reliability Determining System

Figure 1:
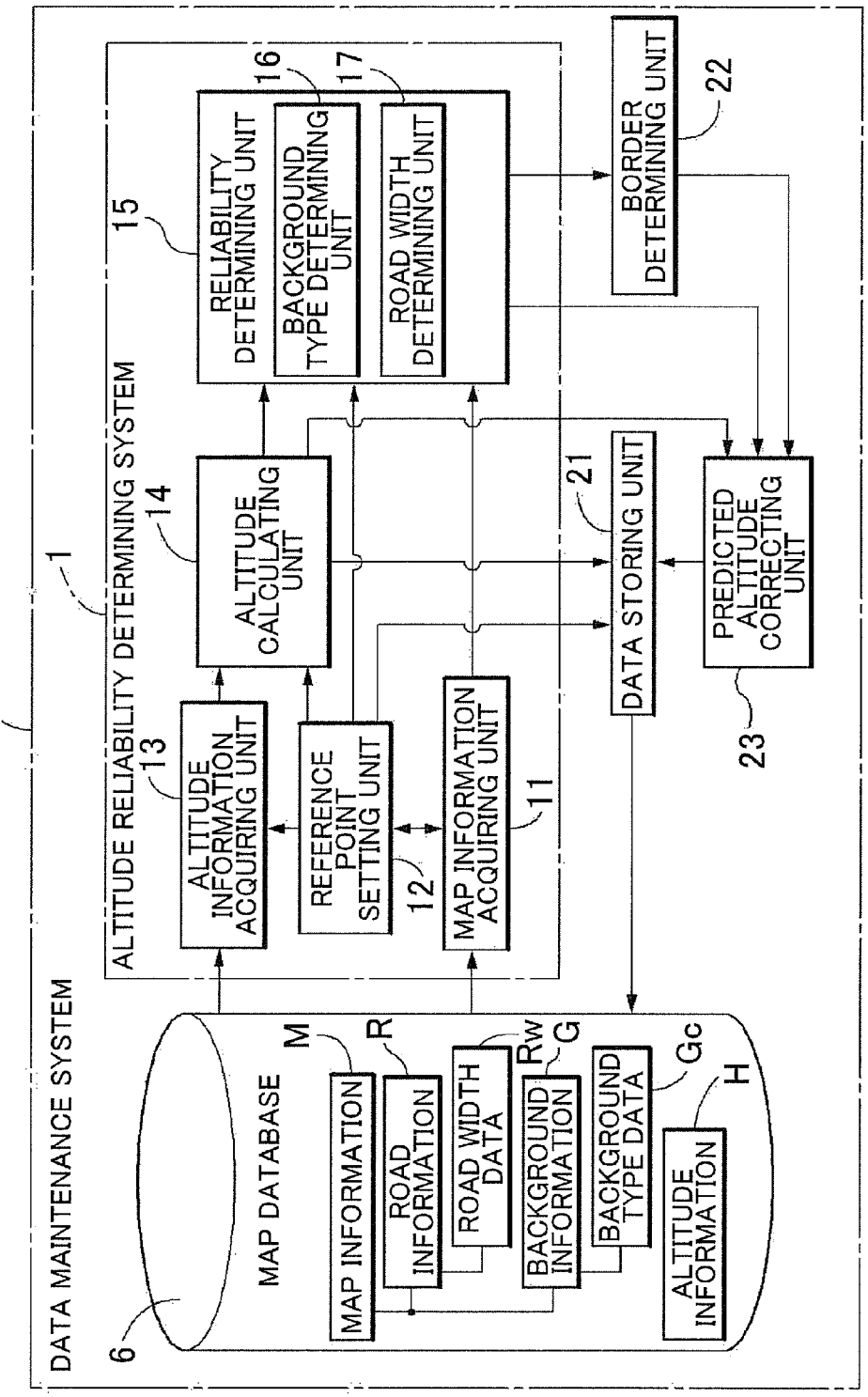
FIG. 1 is a block diagram showing a schematic structure of an altitude reliability determining system and a data maintenance system.

As shown in FIG. 1, the altitude reliability determining system 1 is provided with a map information acquiring unit 11, a reference point setting unit 12, an altitude information acquiring unit 13, an altitude calculating unit 14, and a reliability determining unit 15. Functions to be executed by the respective function parts correspond to the respective "functions" in an altitude reliability determining program stored in a computer-readable storage medium and executed by a controller. In addition, processes to be executed by the respective function parts correspond to the respective "steps" in an altitude reliability determining method. In addition, the altitude reliability determining system 1 is capable of acquiring information from the map database 6.

The map database 6 capable of extracting data from the altitude reliability determining system 1 is a database storing map information M. As shown in FIG. 1, the map information M includes at least the road information R indicating road network and background information G indicating map background. The road information R includes connection information (road network data) between roads represented by nodes and links and attribute information of each road. The attribute information includes road type information (road type data) such as motorways, national roads, prefectural roads, and the like, road length information (road length data), road shape information (road shape data), road width information (road width data Rw), and the like. The background information G includes background type information (background type data Gc) such as rivers, trains, green areas, mountain areas, and the like and attribute information such as background type information (background shape data) indicating outer shapes of the respective areas. In the present example, the background types of "green area" or "mountain area" is assigned to wooded areas in the real world according to altitude distribution in the respective areas. Consequently, in the present example, these background types correspond to "background types corresponding to forest." In addition, the map information M may include feature information indicating various kinds of features (for example, road indications, road signs, traffic signals, and the like) provided on roads and in the vicinity of the roads.

Figure 3:
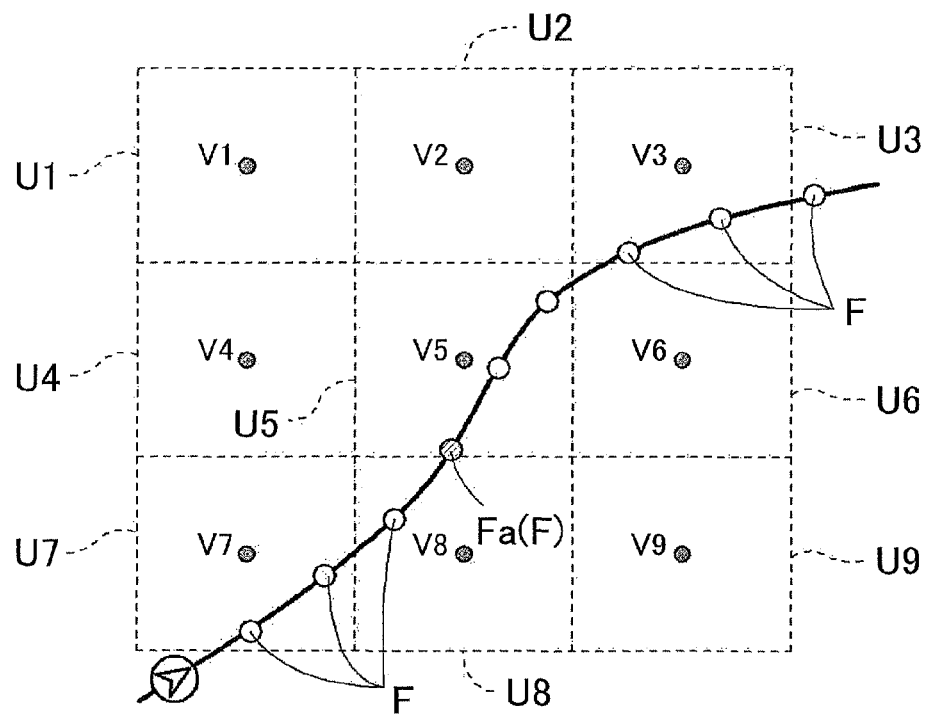
FIG. 3 shows a calculation method of a predicted altitude of each reference point being set on a road.

The map database 6 also includes the altitude information H. The altitude information H in the present example is mesh altitude data provided from the Geographical Survey Institute. The mesh altitude data as the altitude information H is information indicating the altitude of an altitude maintenance point V (for example, a center) of each unit region U (refer to FIG. 3) that is set by dividing a map of the entire country into a plurality of unit regions U having a predetermined size. The unit region U may be, for example, square-shaped region. The length of a side in such case may be 10 m, 50 m, or the like. In order to decrease the capacity of the map database 6 necessary to store the altitude information H, new unit regions U may be created by integrating a plurality of unit regions (for example, 4 or 9 unit regions, or the like).

The map database 6 stores the map information M in association with the predicted altitude h of each reference point F, which is described in detail below. Specifically, the predicted altitude h is stored in association with a specific node or link among a plurality of nodes and a plurality of links included in the road information R of the map information M. For example, the predicted altitude h is stored in association with a point by a predetermined distance from either one of nodes at both ends of a link corresponding to the road where the after-mentioned reference point is set. When the predicted altitude h of the reference point F is corrected by a predicted altitude correcting unit 23, the corrected predicted altitude h' is stored in association with the map information M. These points are described later.

The map information acquiring unit 11 is a function part that acquires the map information M from the map database 6. The map information acquiring unit 11 extracts and acquires the road information R (specifically, the road network data, the road shape data, and the like) from the map database 6 upon a request from the reference point setting unit 12. In addition, the map information acquiring unit 11 extracts and acquires the background information G (specifically, the background type data Gc) from the map database 6 upon a request from a background type determining unit 16. In addition, the map information acquiring unit 11 extracts and acquires the road information R (specifically, the road width data Rw) from the map database 6 upon a request from a road width determining unit 17. The map information acquiring unit 11 also serves as a function part that acquires, from the map database 6, various kinds of information necessary to execute navigation functions such as determination of a vehicle position, map display, and the like.

The reference point setting unit 12 is a function part that sets a plurality of reference points F (refer to FIG. 3) along a road. The reference points F are referred when calculating the predicted altitudes based on the road information R and the altitude information H. The reference points F are also referred when calculating a road inclination described later and when executing a driving assistance process. The reference point setting unit 12 sets a plurality of reference points F based on the road information R (the road network data, the road shape data, and the like) acquired by the map information acquiring unit 11. The reference point setting unit 12 sets a plurality of reference points F such that distances between the reference points next to each other along the road are a fixed distance.

The altitude information acquiring unit 13 is a function part that acquires altitude information H from the map database 6. The altitude information acquiring unit 13 acquires the altitude information H from the map database 6 upon a request from the reference point setting unit 12. The altitude information acquiring unit 13 extracts and acquires a plurality of unit regions containing the respective reference points and the altitude information H for unit regions adjacent to the plurality of unit regions based on the position information of the set plurality of reference points F. "Adjacent" here includes a case in which unit regions share one corner, such as a relation between a unit region U1 and a unit region U5 in FIG. 3, besides a case in which unit regions share one side such as a relation between a unit region U4 and the unit region U5 in FIG. 3.

The altitude calculating unit 14 is a function part that calculates the predicted altitude h of each reference point F based on the road information R and the altitude information H. The altitude calculating unit 14 calculates the predicted altitude h of each reference point F based on the information (position information) regarding a plurality of reference points being set based on the road information R by the reference point setting unit 12 and the altitude information H for a predetermined area acquired by the altitude information acquiring unit 13. The altitude calculating unit 14 calculates for each reference point F the predicted altitude h of the reference point F based on altitude data defined for the four altitude maintenance points V located closer from the reference point F. For example, regarding a reference point Fa identifiably indicated by hatching in FIG. 3, the predicted altitude h of the reference point Fa is calculated as a weighted average based on the altitude data of the respective altitude maintenance points V4, V5, V7, and V8 of the unit regions U4, U5, U7, and U8. In such case, for example, weighting is increased as the distance from the reference point F to the respective altitude maintenance points V decreases (the weighting is made inversely proportional to the distance).

The reliability determining unit 15 is a function part that determines the predicted altitude reliability C which is a reliability of the predicted altitude h calculated by the altitude calculating unit 14. The predicted altitude reliability C is an index that indicates a degree in which an actual altitude (a real altitude) of road surface (ground surface) matches the predicted altitude h. That is, the predicted altitude reliability C is an index that indicates accuracy of the predicted altitude h having the actual altitude (the real altitude) of the ground surface as a reference. Such predicted altitude reliability C is determined with, for example, a value from 0[%] to 100[%], or the corresponding value. The reliability determining unit 15 determines the predicted altitude reliability C of each reference point F based on at least one of the background type data Gc included in the background information G and the road width data Rw included in the road information R at the position of the corresponding reference point F. Therefore, the reliability determining unit 15 is provided with the background type determining unit 16 and the road width determining unit 17.

The background type determining unit 16 is a function unit that determines a background type indicated by the background type data Gc of each reference point F based on the information (the position information) regarding the plurality of reference points F being set by the reference point setting unit 12 and the background type data Gc acquired by the map information acquiring unit 11. As mentioned above, the background information G includes information of background types indicating outer shapes of the respective areas. Therefore, the background type determining unit 16 determines the background type of each reference point F by determining the area containing the position of the corresponding reference pint F. In the present example, especially, the background type determining unit 16 determines whether the background type of each reference point F corresponds to "forest," that is, whether the background type of each reference point F is "green area" or "mountain area" in the present example.

The reliability determining unit 15, when the background type at the position of the reference point F is a type corresponding to "forest" as a result of the determination of the background type determining unit 16, relatively decreases the predicted altitude reliability C of the reference point F compared to the predicted altitude reliability C to be determined when the background type is a type other than types corresponding to "forest." The reliability determining unit 15, when the background type at the position of the reference point F is a type other than the types corresponding to "forest," uniformly determines the predicted altitude reliability C of the reference point F as a standard value C1. On the other hand, the reliability determining unit 15, when the background type at the position of the reference point F is a type corresponding to "forest," uniformly determines the predicted altitude reliability C of the reference point F as a predetermined set value C2 being less than the standard value C1. In the present example, the standard value C1 is defined to a value greater than a first reference value A1, which is described later, and the set value C2 is defined to a value smaller than the first reference value A1.

In the altitude information H provided from the Geographical Survey Institute, the altitudes of the altitude maintenance points V of the respective unit regions U in forest zones (wooded areas) can be the altitudes of trees instead of real road surface altitudes. Thus, the real road surface altitudes are likely to differ from (do not match) the altitudes included in the altitude information H. Thereby, the predicted altitudes h calculated based on the altitude information H may be likely to differ from the real road surface altitudes. On the other hand, in areas such as flat land other than forest zones, such difference rarely arises. In light of such fact, the reliability determining unit 15 determines the predicted altitude reliability C based on whether the background type at the position of the reference point F, which is indicated in the background type data Gc, is a type corresponding to "forest," as described above.

The road width determining unit 17 is a function part that determines a road width indicated in the road width data Rw for each reference point F based on the road width data Rw acquired by the map information acquiring unit 11 for roads on which the reference point setting unit 12 has set a plurality of reference points F. As mentioned above, in the present example, a plurality of reference points F are set on a single road within a predetermined area from the current position of the vehicle. Therefore, a single road width can be determined even for the plurality of reference points F. When a plurality of reference points F are set on a plurality of roads, the road width is determined for each reference point F according to the road on which the reference point F is set.

Figure 7:
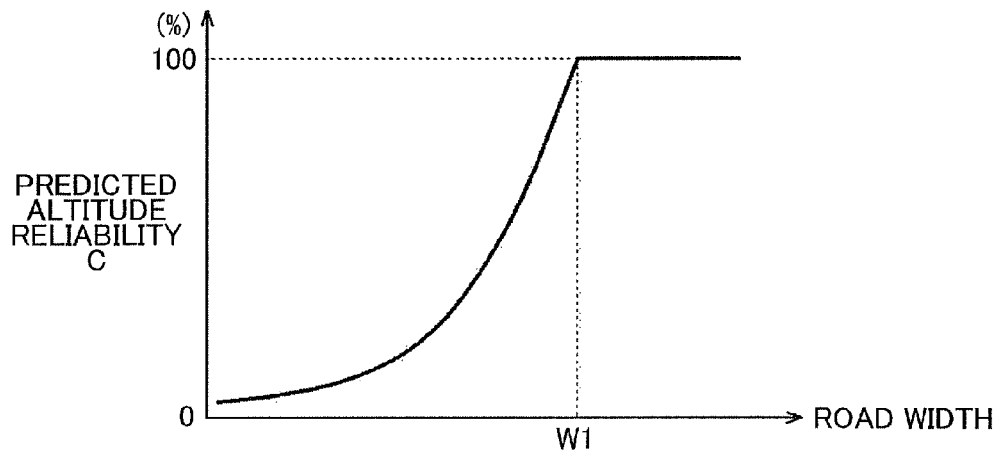
FIG. 7 shows relation between a road width and a predicted altitude reliability.

The reliability determining unit 15 determines, based on the determined result of the road width determining unit 17, the predicted altitude reliability C according to the road width indicated in the road width data Rw for the road on which each reference point F is set. As shown in FIG. 7, the reliability determining unit 15, when the road width is equal to more than a reference width W1, uniformly determines the predicted altitude reliabilities C of the reference points F on the road as 100[%]. Such reference width W1 can be determined based on the length of a diagonal line of the unit region U (refer to FIG. 3) in the altitude information H. When the length of the diagonal line is "D," the reference width W1 may be determined as, for example, a value equal to or greater than "2×D." Or, the reference width W1 may be determined based on the length of one side of the unit region U. On the other hand, the reliability determining unit 15, when the road width is less than the reference width W1, relatively decreases the predicted altitude reliability C of the reference point F on the road as the road width narrows, as shown in FIG. 7. In the present example, the reliability determining unit 15 gradually (sequentially) decreases the predicted altitude reliability C as the road width narrows. In the present example, the reliability determining unit 15 determines the predicted altitude reliabilities C based on the road widths indicated in the road width data Rw and a reliability map, in which the relation between the road widths and the predicted altitude reliabilities C is defined, as shown in FIG. 7.

The narrower the road width is, the smaller the rate of the road to the unit region U is and the greater the rate of the area other than the road is. Thereby, the influence on the predicted altitudes h that the environment in the vicinity of the road exerts becomes greater. On the other hand, the wider the road width is, the larger the rate of the road to the unit region U is and the smaller the rate of the area other than the road is. Thereby, the influence on the predicted altitudes h that the environment in the vicinity of the road exerts becomes smaller. When the road width is equal to or greater than the reference width W1, the predicted altitudes h always match the real road surface altitudes, regardless of the environment in the vicinity of the road. In light of such fact, the reliability determining unit 15, in consideration of the influence on the predicted altitudes h that the environment in the vicinity of the road having a predetermined road width exerts, determines the predicted altitude reliabilities C based on the road widths indicated in the road width data Rw, as described above.

In such manner, the reliability determining unit 15 determines the predicted altitude reliabilities C based on the determined results of the background type determining unit 16 and the determined results of the road width determining unit 17. The reliability determining unit 15 may determine the predicted altitude reliabilities C based on either one among the aforementioned two kinds of determined results, or determine the predicted altitude reliabilities C based on both of the aforementioned two kinds of determined results. In the present example, the reliability determining unit 15 is configured to determine the predicted altitude reliabilities C based on a single information source depending on the later usage of the predicted altitude reliabilities C. Specifically, when the predicted altitude reliabilities C are used for correcting the predicted altitudes h later, the reliability determining unit 15 determines the predicted altitude reliabilities C based on the determined results of the background type determining unit 16 (that is, based on the background type data Gc). On the other hand, when the predicted altitude reliabilities C are used for executing various kinds of assistance processes regarding driving of the vehicle later, the reliability determining unit 15 determines the predicted altitude reliabilities C based on the determined results of the road width determining unit 17 (that is, based on the road width data Rw). Hereinafter, when these respective processes are necessary to be identified, the first process is called the first altitude reliability determining process, and the second process is called the second altitude reliability determining process.

2. Data Maintenance System

As shown in FIG. 1, the data maintenance system 2 is provided with the aforementioned altitude reliability determining system 1, the map database 6, a data storing unit 21, a border determining unit 22, and the predicted altitude correcting unit 23. In the present example, the predicted altitude reliabilities C utilized in the data maintenance system 2 is the predicted altitude reliabilities C determined by the first altitude reliability determining process.

The data storing unit 21 is a function part that stores the map information M in association with the predicted altitude h of each reference point F in the map database 6. The data storing unit 21 receives the information (the position information) regarding each reference point F set by the reference point setting unit 12 and the information of the predicted altitude h of each reference point F calculated by the altitude calculating unit 14 and stores such information in association with the map information M in the map database 6. Specifically, the data storing unit 21 stores the information of the predicted altitude h in association with a specific node or link included in the road information R of the map information M. For example, the data storing unit 21 stores the predicted altitude h in association with a point by a predetermined distance from either one of the nodes at both ends of a link corresponding to a road where the reference point F is set. In the present example, such process is executed for all reference points F independently of the predicated altitude reliabilities C determined by the altitude reliability determining system 1 (the reliability determining unit 15).

However, as mentioned above, in case of the altitude information H provided from the Geographical Survey Institute, the altitudes included in the altitude information H may differ from the real road surface altitudes. As a result, the predicted altitudes h calculated by the altitude calculating unit 14 may differ from the real road surface altitudes. On the other hand, the predicted altitude reliabilities C are an index representing a degree in which the real road surface altitude matches the predicted altitude h. Therefore, it is possible to predict, based on the predicted altitude reliabilities C, areas where the real road surface altitudes differ from the predicted altitudes. That is, it is possible to predict such areas by determining whether the predicted altitude reliabilities C are less than a predetermined threshold value through comparison between the predicted altitude reliabilities C and the threshold value.

The border determining unit 22 provides a part of such function. The border determining unit 22 is a function part that determines, based on the predicted altitude reliabilities C, a border section B that is a section where the predicted altitude reliability C of the reference point increases or decreases across a first reference value A1 in an alignment sequence of the reference points along the road. The first reference value A1 here is a threshold value of the predicted altitude reliability C to determine that the real road surface altitude significantly differs from the predicted altitude h. The first reference value A1 is set to a value greater than the aforementioned set value C2 and smaller than the standard value C1.

Figure 4:
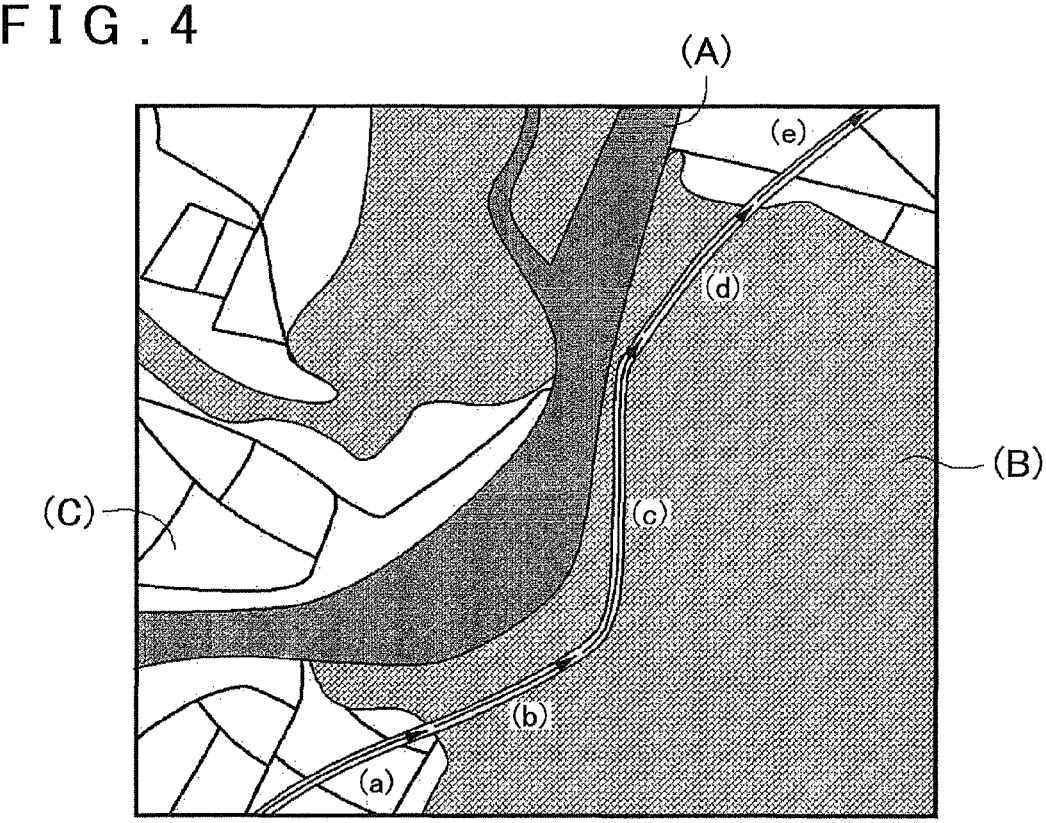
FIG. 4 shows an example of a case in which a vehicle travels through a forest zone.

As an example, a case is assumed, in which a vehicle travels along the arrows in the area shown in FIG. 4. In addition, in FIG. 4, an area (A) painted in black represents a river, an area (B) indicated by hatching represents a forest zone, and the resting area (C) represents flat land. In addition, in FIG. 4, a travel route of the vehicle is divided into 5 sections of (a) to (e), for convenience. Here, it is examined how the predicted altitudes h and the predicted altitude reliabilities C transit along the route.

The section (a) corresponds to the flat land and its background is not a type corresponding to "forest." Therefore, the predicted altitude reliabilities C of the reference points F set on the section are determined as the standard value C1. In this case, it is assumed that the predicted altitudes h calculated based on the altitude information H provided from the Geographical Survey Institute approximately match the real road surface altitudes. On the other hand, the section (b) corresponds to the forest zone (the green area) and its background type is a type corresponding to "forest." Therefore, the predicted altitude reliabilities C of the reference points F set on the section are determined as the set value C2. In this case, it is assumed that the predicted altitudes h calculated based on the altitude information H provided from the Geographical Survey Institute do not match the real road surface altitudes but are higher than the real road surface altitudes. That is, near the entrance from the section (a) to the section (b), the predicted altitude reliability C decreases from the standard value C1 to the set value C2 across the first reference value A1 and the predicted altitude h changes (increases) by a predetermined amount ($\Delta h1$). In the present example, the border determining unit 22 determines the border section between the section (a) and the section (b) as the border section B.

Figure 5:
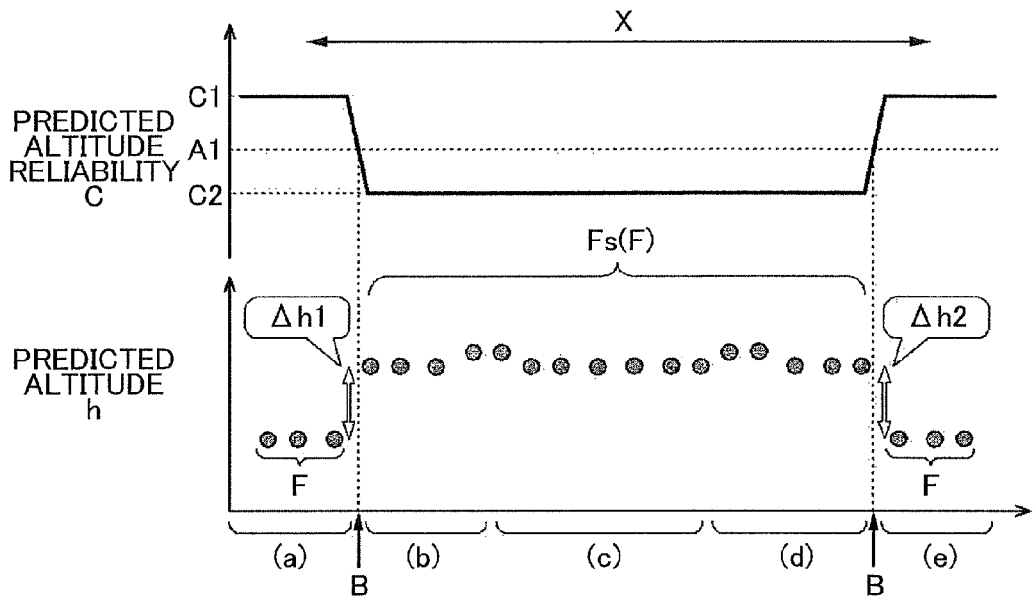
FIG. 5 shows predicted altitudes and predicted altitude reliabilities of respective reference points.

The section (c) and the section (d) also correspond to the forest zone (the green area) and the predicted altitude reliabilities C are maintained to the set value C2 although the predicted altitudes h slightly change according to the altitude distribution indicated in the altitude information H. The section (e) corresponds to the flat land and the predicted altitude reliabilities C of the reference points F set on the section are determined as the standard value C1 because it is assumed that the predicted altitudes h approximately match the real road surface altitudes. That is, near the entrance from the section (d) to the section (e), the predicted altitude reliability C increases from the set value C2 to the standard value C1 across the first reference value A1 and the predicted altitude h changes (decreases) by a predetermined amount ($\Delta h2$). In the present example, the border determining unit 22 determines the border section between the section (b) and the section (e) as the border section B. FIG. 5 shows such situation. The respective black circles in FIG. 5 correspond to the reference points F not shown in FIG. 4.

The predicted altitude correcting unit 23 is a function part that corrects the predicted altitudes h associated with specific reference points Fs. The specific reference points are reference points having the predicted altitude reliabilities C less than the first reference value A1 among a plurality of reference points F. This is because it can be assumed that the predicted altitudes h at the specific reference points F having the predicted altitude reliabilities C being less than the first reference value A1 have a significant difference against the real road surface altitudes. The predicted altitude correcting unit 23 corrects the predicted altitudes h associated with the specific reference points Fs based on the predicted altitudes h of other reference points F having the predicted altitude reliabilities C equal to or greater than the first reference value A1. This is because it can be assumed that the predicted altitudes h at the reference points F having the predicted altitude reliabilities C equal to or greater than the first reference value approximately match the real road surface altitudes.

Figure 6:
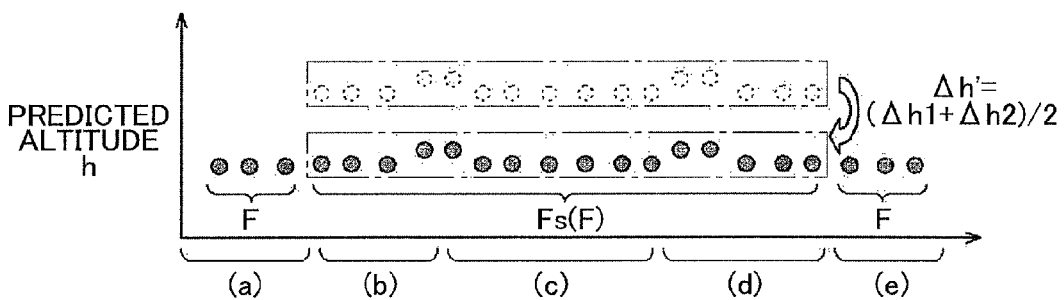
FIG. 6 shows a correcting method of predicted altitudes of respective reference points.

In the present example, the predicted altitude correcting unit 23 corrects the predicted altitudes h when the border section B where the predicted altitude reliability C decreases and the border section B where the predicted altitude reliability C increases exist in a pair within a predetermined correction determination distance X. Here, the correction determination distance X can be set to, for example, a value which can make the respective differences between the predicted altitudes h in a pair of border sections B within a predetermined range, in the basis of the experience. The predicted altitude correcting unit 23 corrects, based on the change amounts $\Delta h1$ and $\Delta h2$ of the respective predicted altitudes h in a pair of border sections B, the predicted altitudes h so as to offset the change amounts $\Delta h1$ and $\Delta h2$ for all specific reference points Fs located between a pair of border sections B. Specifically, the predicted altitude correcting unit 23 calculates a predicted altitude correction amount $\Delta h'$ as an average value of the change amounts $\Delta h1$ and $\Delta h2$ ($\Delta h'=(\Delta h1+\Delta h2)/2$). Thereafter, the predicted altitude correcting unit 23 collectively corrects the predicted altitudes h by uniformly subtracting the predicted altitude correction amount $\Delta h'$ from the respective predicted altitudes h before correction, as shown in FIG. 6, for all specific reference points Fs and define them as the corrected predicted altitudes h'.

When the predicted altitude correcting unit 23 has corrected the predicted altitudes h of the specific reference points Fs, the data storing unit 21 stores the information of each corrected predicted altitude h' in association with the specific node or link included in the road information R of the map information M. In such case, the information of the predicted altitudes h before correction may be replaced with the information of the corrected predicted altitudes h'. Or, the information being capable of identifying both the predicted altitudes h and the corrected predicted altitudes h' may be stored together.

3. Driving Assistance System

Figure 2:
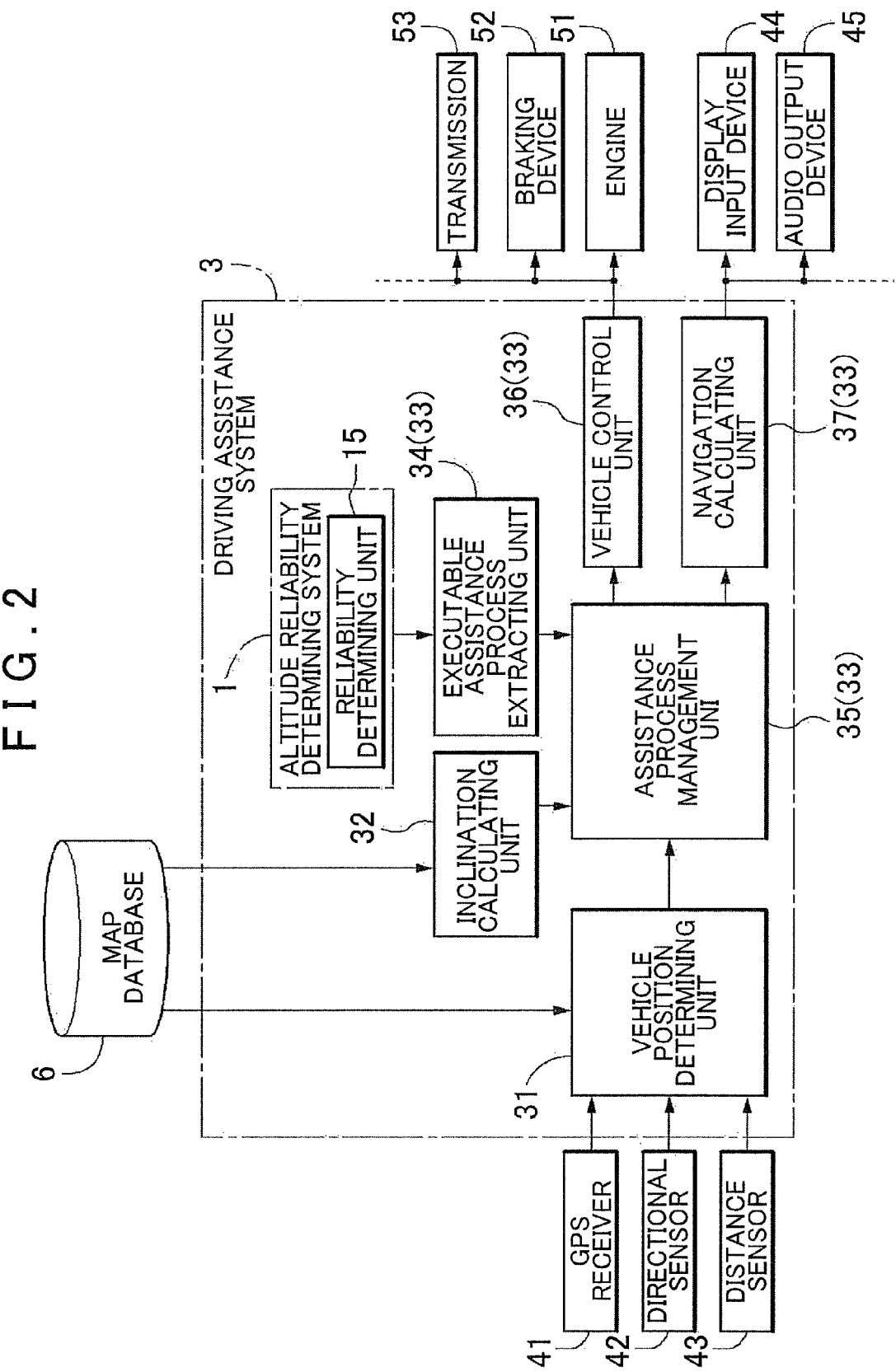
FIG. 2 is a block diagram showing a schematic structure of a driving assistance system.

As shown in FIG. 2, the driving assistance system 3 is provided with the aforementioned altitude reliability determining system 1, a vehicle position determining unit 31, an inclination calculating unit 32, and an assistance process executing unit 33. In the present example, the assistance process executing unit 33 includes an executable assistance process extracting unit 34, an assistance process management unit 35, a vehicle control unit 36, and a navigation calculating unit 37. In addition, the driving assistance system 3 is able to acquire information from the map database 6. In the present example, the predicted altitude reliabilities C utilized in the driving assistance system 3 are the predicted altitude reliabilities C determined by the second altitude reliability determining process in the altitude reliability determining system 1.

The vehicle position determining unit 31 is a function part that determines a vehicle position being the current position of the vehicle. The vehicle position determining unit 31 determines the vehicle position indicated by a coordinate (a latitude and a longitude) on the map through a known computing method based on the information acquired by a GPS receiver 41, a directional sensor 42, and a distance sensor 43. In addition, the vehicle position determining unit 31 corrects the vehicle position by map-matching the vehicle position on the road based on the map information M (the road information R) stored in the map database 6. When an image-capturing unit is provided in the vehicle, the vehicle position determining unit 31 may correct the vehicle position with higher accuracy based on image recognition results of features such as road signs provided on the road surface. The information of the determined vehicle position is utilized as vehicle position information.

The inclination calculating unit 32 is a function part that calculates road inclination at predetermined intervals along a road. In the present example, for example, the inclination calculating unit 32 extracts reference points F located on a single road within a predetermined area ahead of the vehicle in relation to the travel direction from the current position of the vehicle indicated in the vehicle position information acquired by the vehicle position determining part 31 and calculates road inclination for each of the extracted reference points F. However, the example is not limited to such structure. A plurality of reference points F may be extracted for each road (or for each link) instead of the predetermined area. Or, a plurality of reference points F may be extracted through a plurality of roads. The inclination calculating unit 32 reads out the predicted altitude h (including the corrected predicted altitude h') associated with each reference point F from the map database 6 and calculates the road inclination based on the read predicted altitude h. Specifically, the rate of the difference in the predicted altitude h between two reference points F far from each other by a predetermined distance to the distance along a road between the reference points F is calculated as the road inclination. The information of the calculated road inclination is utilized as inclination information. The inclination calculating unit 32 may be provided in the data maintenance system 2 and the calculated inclination information may be stored in the map database 6.

The assistance process executing unit 33 is a function part that executes a specific assistance process APs selected from a plurality of assistance processes AP regarding driving assistance of a vehicle based on the predicted altitude h. When the inclination information is stored in the map database 6, the assistance process executing unit 33 may extract the inclination information from the map database 6 and execute the specific assistance process APs based on the extracted inclination information.

Here, in the present example, the plurality of assistance processes AP include a guidance assistance process AP1 and a vehicle control assistance process AP2. The guidance assistance process AP1 is an assistance process to provide various kinds of information to the occupants of the vehicle. The guidance assistance process AP1 includes, for example, information providing process, warning call process, and the like. The information providing process is a process to provide information regarding road conditions in the vicinity of the vehicle and the like (for example, existence of an uphill or a downhill ahead). The warning call process is a process to perform warning call by notifying possible danger in view of the vehicle condition to the occupants (for example, paying attention to the vehicle speed because of a long downhill existing ahead).

The vehicle control assistance process AP2 is an assistance process to control the behavior of the vehicle. The vehicle control assistance process AP2 includes, for example, a gear change control process, a drive force control process, a charge amount control process, a brake force control process, and the like. Among these processes, the gear change control process, the drive force control process, and the charge amount control process correspond to the assistance process AP for driving control (a driving control assistance process AP2a). The resting brake control process corresponds to the assistance process AP for safe control (a safe control assistance process AP2b). The gear change control process is a process to change a change gear ratio of a transmission provided in the vehicle according to the road inclination. The drive force control process is a process to adjust a torque transmitted to the wheels of the vehicle according to the road inclination. The charge amount control process is a process to adjust the charge amount of a battery according to the road inclination when a rotating electrical machine and a battery for driving the rotating electrical machine are provided in the vehicle, for example. The brake force control process is a process to adjust the brake force according to the road inclination using an electric control braking device or the like. In the present example, these processes correspond to the "assistance process" in the present invention.

In the present example, the assistance process executing unit 33 extracts, based on the predicted altitude reliability C, one or more executable assistance processes APc that are assistance processes AP executable with such predicted altitude reliability C and selects one or more specific assistance processes APs from the extracted executable assistance processes APc. The executable assistance process extracting unit 34, the assistance process management unit 35, the vehicle control unit 36, and the navigation calculating unit 37 realize such function in a coordinate manner.

The executable assistance process extracting unit 34 is a function part that extracts, based on the predicted altitude reliability C, the executable assistance processes APc that are the assistance processes executable with such predicted altitude reliability C. The executable assistance process extracting unit 34 extracts the executable assistance processes APc based on predetermined plurality of threshold values (the reference values). The executable assistance process extracting unit 34, when the predicted altitude reliability C is equal to or greater than a predetermined second reference value A2, determines the guidance assistance process AP1 as the executable assistance process APc and extracts the guidance assistance process AP1, as shown by "○" in FIG. 8. In addition, the executable assistance process extracting unit 34, when the predicted altitude reliability C is equal to or greater than a predetermined third reference value A3, determines the vehicle control assistance process AP2 as the executable assistance process APc and extracts the vehicle control assistance process AP2. Here, in the present example, only driving control assistance process AP2a among the vehicle control assistance process AP2 is extracted as the executable assistance process APc. The executable assistance process extracting unit 34, when the predicted altitude reliability C is equal to or greater than a predetermined fourth reference value A4, determines the safe control assistance process AP2b as the executable assistance process APc and extracts the safe control assistance process AP2b.

That is, in the present example, the second reference value A2, which is the threshold value of the predicted altitude reliability C to determine the guidance assistance process AP1 as the executable assistance process APc, is set to a smaller value than the third reference value A3 and the fourth reference value A4, which are the threshold values of the predicted altitude reliability C to determine the vehicle control assistance process AP2 as the executable assistance process APc. In addition, the third reference value A3, which is the threshold value of the predicted altitude reliability C to determine the driving control assistance process AP2a as the executable assistance process APc, is set to a smaller value than the fourth reference value A4, which is the threshold value of the predicted altitude reliability C to determine the safe control assistance process AP2b as the executable assistance process APc.

The safe control assistance process AP2b is an assistance process AP to change the behavior of the vehicle forcibly and largely. Therefore, it must be executed in a necessary situation at a necessary position without errors. When the predicted altitude reliability C is relatively low, the reliability of the inclination information calculated from the predicted altitude h is relatively low. Therefore, it is preferable that the safe control assistance process AP2b is not executed rather than that the safe control assistance process AP2b is mistakenly executed. On the other hand, the guidance assistance process AP1 is an assistance process AP for convenience of the occupants of the vehicle. Therefore, the operation frequency is important, and erroneous execution is permitted to some extent. Thus, it is preferable that the guidance assistance process AP1 is actively executed even though the predicted altitude reliability C is low to a certain extent. Regarding the driving control assistance process AP2a, both the accuracy and the operation frequency are required to a certain extent. Therefore, in consideration of such fact, the relation among the respective reference values A2 to A4 is defined as above.

The assistance process management unit 35 selects one or more specific assistance processes APs from the one or more executable assistance processes APc extracted by the executable assistance process extracting unit 34, based on the vehicle position information and the inclination information. The assistance process management unit 35 selects, according to the road inclination indicated in the inclination information of the reference point F indicated in the vehicle position information that the vehicle is approaching, one or more assistance processes AP to be executed at the position of the reference point F as the specific assistance processes APs. The assistance process management unit 35 outputs the control command according to the contents of the selected specific assistance processes APs to either one or both of the vehicle control unit 36 and the navigation calculating unit 37.

The vehicle control unit 36 is a function part that executes the vehicle control assistance process AP2 (the driving control assistance process AP2a and the safe control assistance process AP2b). The vehicle control unit 36 controls the behavior of the respective units (an engine 51, a braking device 52, a transmission 53, and the like) based on the control command from the assistance process management unit 35. The navigation calculating unit 37 is a function part that executes the guidance assistance process AP1. The navigation calculating unit 37 performs, based on the control command from the assistance process management unit 35, various kinds of information supplies and warning calls through a display input device 44 such as a touch panel display, an audio output device 45 such as a speaker, and the like.

4. Processing

An altitude reliability determining process, a map data maintenance process, and the driving assistance process executed in the navigation system (including the altitude reliability determining system 1, the data maintenance system 2, the driving assistance system 3) according to the present example are explained below with reference to the algorithms in FIGS. 9-11B. The procedure of the respective processes explained below may be executed by hardware, software, or combination of hardware and software (a program), which form the respective function parts of the systems. When the aforementioned function parts are structured by the program, the arithmetic processing devices included in the systems function as computers that execute the program forming the aforementioned respective function parts.

4-1. Altitude Reliability Determining Process

Figure 9:
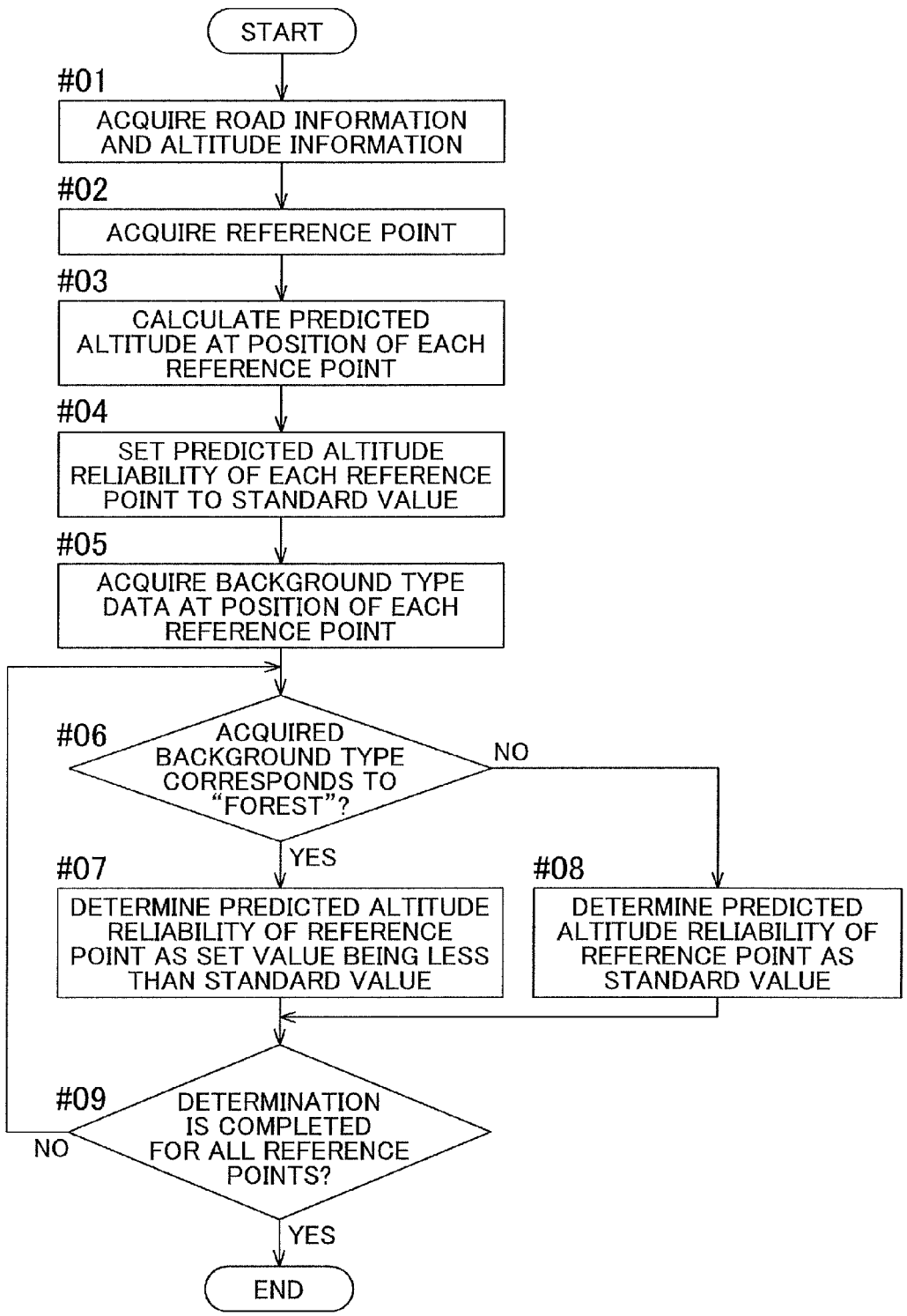
FIG. 9 is a flowchart showing steps of a first altitude reliability determining process algorithm.

As shown in a flowchart of FIG. 9, in the altitude reliability determining process (the first altitude reliability determining process, here), the road information R and the altitude information H are acquired from the map database 6 (Step #01). Based on the acquired road information R, a plurality of reference points F are acquired (#02). Based on the road information R and the altitude information H, the predicted altitude h at the position of each reference point F is calculated (#03). The position information and the predicted altitude h of each reference point F are associated and stored in the map database 6 although it is not shown. In addition, in the present example, the predicted altitude reliability C of each reference point F is provisionally set to the standard value C1 (#04). In addition, the background information G (the background type data Gc) at the position of each reference point F is acquired from the map database 6 (#05).

Next, it is determined for each reference point F whether the background type indicated in the acquired background type data Gc is "green area" or "mountain area" corresponding to "forest" (#06). When the background type corresponds to "forest" (#06: Yes), the predicted altitude reliability C of the reference point F is changed to the set value C2, which is less than the standard value C1 (#07). On the other hand, when the background type does not correspond to "forest" (#06: No), the predicted altitude reliability C of the reference point F is formally determined as the standard value C1 (#08). The processes from #06 to #08 are repeated until the determination is completed for all of the set reference points F (#09). Then, the first altitude reliability determining process is terminated.

4-2. Map Data Maintenance Process

Figure 10:
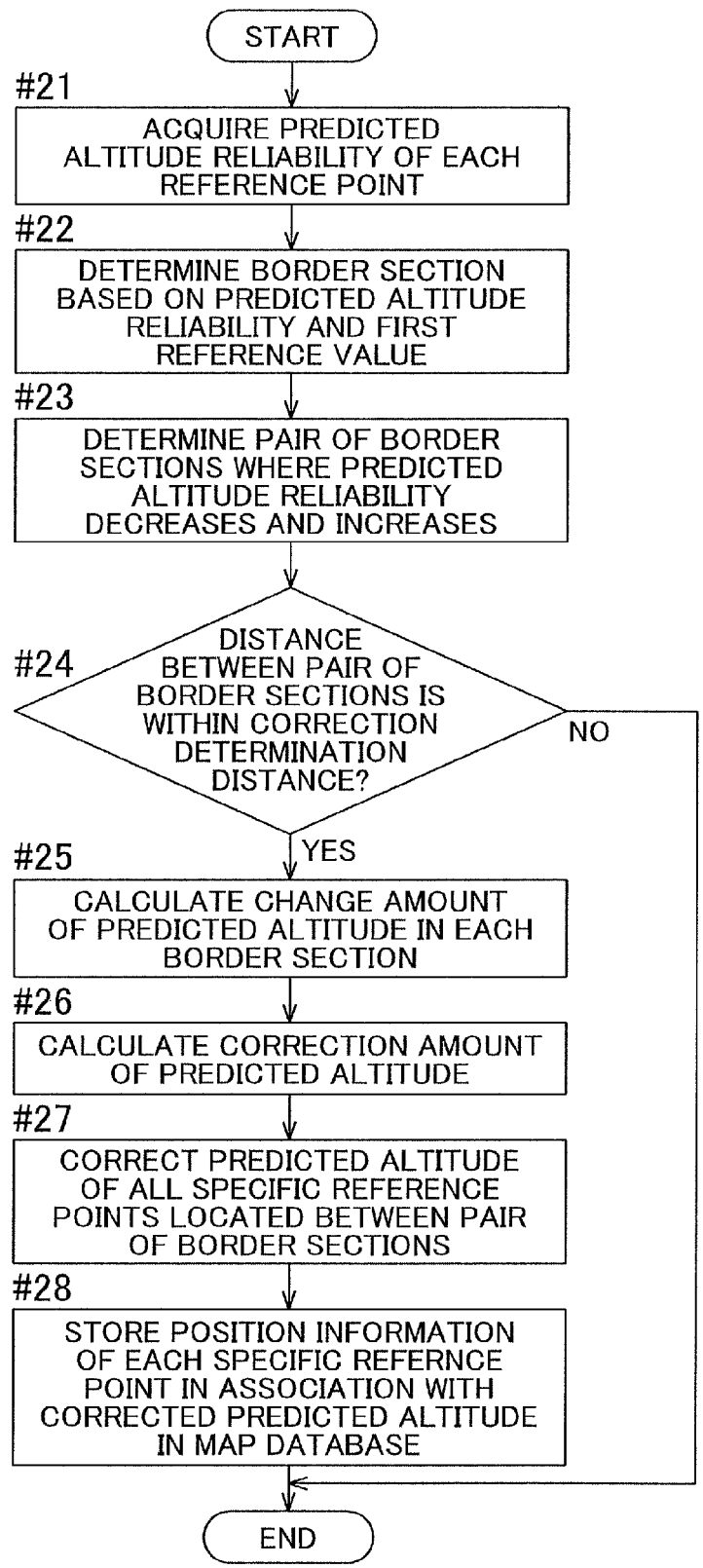
FIG. 10 is a flowchart showing steps of a map data maintenance process algorithm.

As shown in a flowchart of FIG. 10, in the map data maintenance process, the predicted altitude reliability C of each reference point F acquired by the aforementioned first altitude reliability determining process is acquired (#21). Based on the acquired predicted altitude reliability C and the predetermined first reference value A1, the border section B is determined (#22). In addition, a pair of border sections B in one of which the predicted altitude reliability C decreases and in the other of which the predicted altitude reliability C increases across the first reference value A1 is determined (#23). Thereafter, it is determined whether the distance between the pair of border sections B is shorter than or equal to the correction determination distance X (#24). When the distance between the pair of border sections B is greater than the correction determination distance X (#24: No), the map data maintenance process is terminated. In such case, the position information and the predicted altitude h before correction of each reference point F are associated and stored in the map database 6.

On the other hand, when the distance between the pair of border sections B is shorter than or equal to the correction determination distance X (#24: Yes), the change amounts Δh1 and Δh2 in the predicted altitude h in each section of the pair of border sections B are calculated (#25). Based on the calculated change amounts Δh1 and Δh2, the predicted altitude correction amount Δh' is calculated as an average value of these change amounts (#26). Thereafter, the predicted altitudes h are corrected for all of the reference points F (the specific reference points Fs) located between the pair of border sections B by uniformly subtracting the predicted altitude correction amount Δh' from the respective predicted altitudes h before correction (#27). The corrected predicted altitudes h' is associated with the position information of the respective specific reference points Fs and stored in the map database 6 (#28). Then, the map data maintenance process is terminated.

4-3. Driving Assistance Process

Figure 11A:
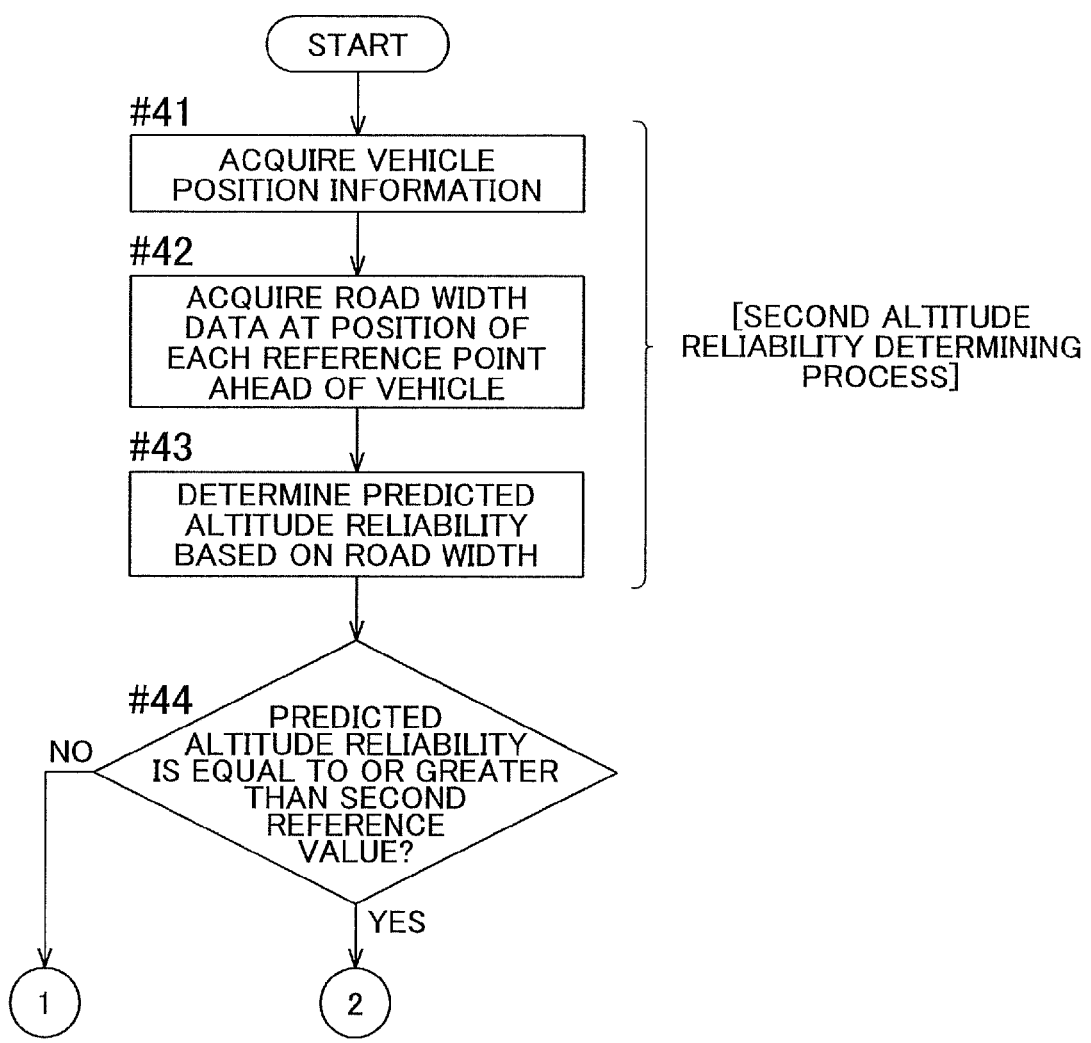
FIGS. 11A and 11B are a flowchart showing steps of a driving assistance process including a second altitude reliability determining process algorithm.
Figure 11B:
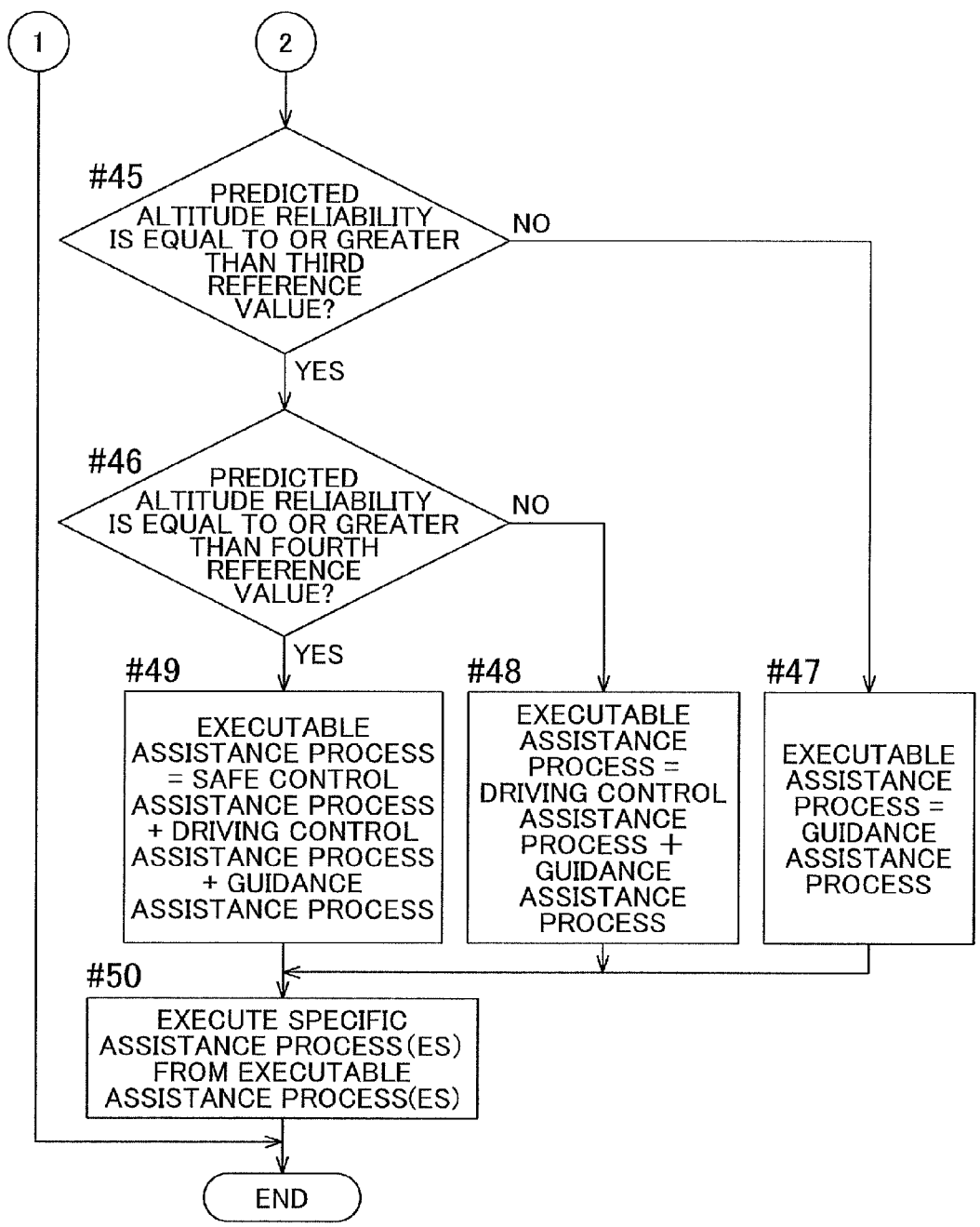

As shown in a flowchart of FIGS. 11A and 11B, prior to the driving assistance process, the second altitude reliability determining process (#41 to #43) is executed. In the second altitude reliability determining process, the vehicle position information is acquired (#41), and the road width data Rw at the positions of the respective reference points F included in the predetermined area ahead of the vehicle position in relation to the travel direction is acquired from the map database 6 (#42). Based on the acquired road width data Rw and the reliability map shown in FIG. 7, the predicted altitude reliability C of each reference point F is determined (#43).

In the driving assistance process, the predicted altitude reliability C of each reference point F acquired by the second altitude reliability determining process is equal to or greater than the second reference value A2 (#44). When the predicted altitude reliability C is smaller than the second reference value A2 (#44: No), any assistance processes AP are not executable. Therefore, the driving assistance process is terminated. When the predicted altitude reliability C is greater than or equal to the second reference value A2 (#44: Yes), it is determined whether the predicted altitude reliability C is equal to or greater than the third reference value A3 (#45), and thereafter, whether the predicted altitude reliability C is equal to or greater than the fourth reference value A4 (#46).

When the predicted altitude reliability C is equal to or greater than the second reference value A2 and less than the third reference value A3 (#45: No), only the guidance assistance process AP1 is extracted as the executable assistance process APc (#47). When the predicted altitude reliability C is equal to or greater than the third reference value A3 and less than the fourth reference value A4 (#46: No), the guidance assistance process AP1 and the driving control assistance process AP2a are extracted as the executable assistance processes APc (#48). When the predicted altitude reliability C is equal to or greater than the fourth reference value A4 (#46: Yes), all of the guidance assistance process AP1, the driving control assistance process AP2a, and the safe control assistance process AP2b are extracted as the executable assistance processes APc (#49). Thereafter, according to the road inclination of the upcoming reference F, one or more specific assistance processes APs are selected from the executable assistance process(es) APc and executed (#50). Then, the second altitude reliability determining process and the driving assistance process are terminated.

The aforementioned respective processes may be repeatedly executed while the vehicle is traveling.

5. Modifications and/or Alternatives

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying inventive principles.

For example, the following modifications and/or alternatives may be implemented and may be applied in combination with the structures disclosed in other examples unless any inconsistency does not arise.

In the aforementioned example, a structure is exemplified, in which the reliability determining unit 15 determines the predicted altitude reliability C based on a single information source (the background type data Gc or the road width data Rw) according to the subsequent usage manner of the predicted altitude reliability C. However, the reliability determining unit 15 may determine the predicted altitude reliability C based on the same information source independently of the subsequent usage manner of the predicted altitude reliability C. In such case, the reliability determining unit 15 can determine the predicted altitude reliability C based on both the background type data Gc and the road width data Rw. For example, the reliability determining unit 15 may determine, as the predicted altitude reliability C, a candidate value determined based on the background type data Gc or a candidate value determined based on the road width data Rw, whichever is higher or smaller. Or, the reliability determining unit 15 may determine, as the predicted altitude reliability C, a multiplied value of the candidate value determined based on the background type data Gc and the candidate value determined based on the road width data Rw.

In the aforementioned example, a structure is exemplified, in which, in the first altitude reliability determining process, the reliability determining unit 15 determines the predicted altitude reliability C based on whether the background type of each reference point is "green area" or "mountain area" corresponding to "forest." However, the background types corresponding to "forest" may be arbitrarily set by a designer. In addition to the background types corresponding to "forest," the designer can set background types corresponding to areas where the predicted altitudes h are supposed to be likely to differ from the real road surface altitudes as determining target in the first altitude reliability determining process.

In the aforementioned example, a structure is exemplified, in which, in the second altitude reliability determining process, the reliability determining unit 15 gradually decreases the predicted altitude reliability C as the road width narrows when the road width is less than the reference width W1. However, the reliability determining unit 15 may decrease the predicted altitude reliability C in a phased manner as the road width narrows. In such case, the predicted altitude reliability C may be determined in accordance with the road size represented by, for example, the number of lanes. In addition, the information of the number of lanes (lane number data) may be included in the road information R stored in the map database 6.

In the aforementioned example, a structure is exemplified, in which the predicted altitude correcting unit 23 collectively corrects the predicted altitudes h for all of the specific reference points Fs located between a pair of the border sections B based on the calculated predicted altitude correction amount Δh'. However, the predicted altitude correcting unit 23 may separately correct the predicted altitudes h for the respective specific points Fs located between the pair of the border sections B.

In the aforementioned example, a structure is exemplified, in which the assistance process executing unit 33 executes the specific assistance process APs based on the inclination information calculated by the inclination calculating unit 32. However, the assistance process executing unit 33 may execute the specific assistance process APs based on the predicted altitude h or information other than the inclination information calculated from the predicted altitude h.

In the aforementioned example, a structure is exemplified, in which the inclination calculating unit 32 calculates the road inclination for each reference point F. However, the inclination calculating unit 32 may calculate the road inclination along the road at predetermined intervals independently of the reference points F. For example, when the road information R includes information of shape interpolating points representing the road shape, the inclination calculating unit 32 may calculate the road inclination for each shape interpolating point. Or, the inclination calculating unit 32 may calculate the road inclination for each point being set at certain intervals along the road independently of the reference points F.

In the aforementioned example, a structure is exemplified, in which a plurality of assistance processes AP is classified into the guidance assistance process AP1, the driving control assistance process AP2a, and the safe control assistance process AP2b. However, a plurality of assistance processes AP may be classified into the guidance assistance process AP1 and the vehicle control assistance process AP2 without the vehicle control assistance process AP2 being classified into the driving control assistance process AP2a and the safe control assistance process AP2b. In such case, when the predicted altitude reliability C is equal to or greater than the predetermined third reference value A3, both the driving control assistance process AP2a and the safe control assistance process AP2b are extracted as the executable assistance processes APc.

6. Advantages

According to the above examples, the predicted altitude reliability of the predicted altitude calculated for each of a plurality of reference points is determined based on at least one of the background type data and the road width data. The environment in the vicinity of a road can be supposed to correspond to the background type data included in the background information generally on one-to-one relation. Therefore, by previously setting background types corresponding to the environment where the actual altitudes (the real altitudes) of road surface may differ from the altitudes included in the altitude information, the predicted altitude reliability of each reference point can be properly determined based on the background type data at the position of the reference point. In addition, when a road width indicated in the road width data included in the road information is large with respect to the size of the unit region in the altitude information, the real altitude of road surface is less likely to differ from the altitude included in the altitude information. Therefore, by previously setting the relation between the possibility of such difference and the road width, the predicted altitude reliability of each reference point can be properly determined based on the road width data at the position of the reference point. Thus, it is possible to realize an altitude reliability determining system capable of properly determining the predicted altitude reliabilities independently of the attributes of the areas where the roads are constructed.

When the background type indicated in the background type data is a type corresponding to the forest, the altitude included in the altitude information may be the altitude of surface of trees existing in the forest instead of the real altitude of road surface. Therefore, it may be highly likely that the predicted altitude calculated based on such altitude information differ from the real altitude of the road surface. On the other hand, when the background type indicated in the background type data is a type other than types corresponding to the forest, such difference is less likely to arise. Consequently, according to the aforementioned configuration, the predicted altitude reliability is properly determined based on whether the background type indicated in the background type data at the position of the reference point is a type corresponding to the forest.

The narrower the road width is, the smaller the rate of the road to the unit region in the altitude information is and the greater the rate of the area other than the road is. Thereby, the influence on the predicted altitudes that the environment in the vicinity of the road exerts becomes greater. Consequently, according to the above examples, in consideration of the influence on the predicted altitudes that the environment in the vicinity of the road having a predetermined road width exerts, the predicted altitude reliability can be properly determined based on the road width indicated in the road width data.

According to the above examples, it is possible to determine properly whether the real altitude of road surface at each reference point approximately accords with the predicted altitude based on the predicted altitude reliability properly determined by the altitude reliability determining system and the predetermined first reference value. Thereafter, it is possible to correct the predicted altitudes of the specific reference points determined as being not accorded so as to be close to the real altitudes of the road surface. Therefore, it is possible to realize a data maintenance system being capable of properly correcting the predicted altitudes stored in association with the map information.

According to the above examples, it is possible to detect that a pair of border sections where the predicted altitude reliability decreases and increases exist within a predetermined correction determination distance and correct collectively the predicted altitudes of all specific reference points located between the pair of border sections. Thus, it is possible to simplify the process to correct predicted altitudes compared to, for example, the process to correct separately the predicted altitudes of the specific reference points. In such case, the predicted altitudes are corrected such that the change amounts are offset based on the respective change amounts of the predicted altitudes in the pair of border sections. Therefore, it is possible to make the predicted altitudes of the respective specific reference points close to the real altitudes of the road surface.

According to the above examples, it is possible to extract the executable assistance processes properly based on the predicted altitude reliability properly determined by the altitude reliability determining system. Thereby, one or more specific assistance processes are selected from the properly extracted executable assistance processes. Thus, it is possible to realize a driving assistance system capable of properly executing the respective kinds of driving assistance processes based on the inclination information calculated from the predicted altitudes.

The vehicle control assistance process is an assistance process to change the behavior of the vehicle forcibly. Therefore, it must be executed in a necessary situation at a necessary position without errors. When the predicted altitude reliability is relatively low, the reliability of the predicted altitude and the information calculated from the predicted altitude is relatively low. Therefore, it is preferable that the vehicle control assistance process is not executed rather than mistakenly executed. On the other hand, the guidance assistance process is an assistance process for convenience of the occupants of the vehicle. Therefore, the operation frequency is important and erroneous execution is permitted to some extent. Thus, it is preferable that the guidance assistance process is actively executed even though the predicted altitude reliability is low to a certain extent. In view of such point, by setting the second reference value to a value smaller than the third reference value as indicated above, the respective specific assistance processes can be set properly as executable depending on the required accuracy and operation frequency.

It should be appreciated that it is not necessary for all of the above advantages to be present in a particular implementation at the same time. That is, in a particular implementation of the inventive principles, at least one of the above-described advantages may be achieved.

What is claimed is:

1. An altitude reliability determining system, comprising:
   a controller that:
   acquires map information including road information and background information, the road information including road width data and the background information including background data that at least includes data for background types corresponding to a forest;
   acquires altitude information indicating an altitude of each unit region, the unit region being set by dividing a map indicated in the map information into a plurality of unit regions having a predetermined size;
   calculates a predicted altitude of each of a plurality of reference points based on the road information and the altitude information, the plurality of reference points being set along a road;

accesses the road information and the background information at a position of each of the reference points; and determines a predicted altitude reliability of each of the reference points based on at least one of the background data and the road width data at the position of the each of the reference points;

wherein, when the background data at the position of one of the reference points is a type corresponding to a forest, the predicted altitude reliability of the reference point is set to a first predetermined value that is less than a second predetermined value for the predicted altitude reliability when the background type is a type other than a forest.

2. The altitude reliability determining system according to claim 1, wherein the controller:

when determining the predicted altitude reliability of each of the reference points, adjusts the predicted altitude reliability on a scale in which the narrower the road width, the lower that the predicted altitude reliability is adjusted.

3. A data maintenance system, comprising:

the altitude reliability determining system according to claim 1; and a map database storing the map information in association with the predicted altitude of each reference point;

wherein:

the controller in the altitude reliability determining system is a first controller; and at least one of the first controller and a second controller in the data maintenance system corrects a predicted altitude associated with a specific reference point based on the predicted altitude of at least one reference point having the predicted altitude reliability being equal to or greater than a predetermined first reference value, the specific reference point having the predicted altitude reliability being smaller than the first reference value among the reference points.

4. The data maintenance system according to claim 3, wherein at least one of the first controller and the second controller:

determines a border section being a section where the predicted altitude reliability of the reference point increases or decreases across the first reference value in an alignment sequence of the reference points along the road; and when the border section where the predicted altitude reliability decreases and the border section where the predicted altitude reliability increases exist in a pair within a predetermined correction determination distance, corrects the predicted altitudes of all of the specific reference points located between the pair of border sections so as to offset change amounts based on the respective change amounts of the predicted altitudes in the pair of border sections.

5. A driving assistance system comprising:

the altitude reliability determining system according to claim 1; and a controller that:

executes a specific assistance process based on the predicted altitude, the specific assistance process being selected from a plurality of assistance processes relating to driving assistance of a vehicle;

extracts one or more executable assistance processes which are the assistance processes executable with the predicted altitude reliability; and selects and executes one or more specific assistance processes from the extracted one or more executable assistance processes.

6. The driving assistance system according to claim 5, wherein:

the plurality of assistance processes include a vehicle control assistance process to control vehicle behavior and a guidance assistance process to provide various kinds of information to an occupant of the vehicle, and a second reference value is set smaller than a third reference value, the second reference value being a threshold value of the predicted altitude reliability to determine the guidance assistance process as the executable assistance process, the third reference value being a threshold value of the predicted altitude reliability to determine the vehicle control assistance process as the executable assistance process.

7. An altitude reliability determining method, comprising:

acquiring map information including road information and background information, the road information including road width data and the background information including background data that at least includes data for background types corresponding to a forest;

acquiring altitude information indicating an altitude of each unit region, the unit region being set by dividing a map indicated in the map information into a plurality of unit regions having a predetermined size;

calculating a predicted altitude of each of a plurality of reference points based on the road information and the altitude information, the plurality of reference points being set along a road;

accessing the road information and the background information at a position of each of the reference points; and determining a predicted altitude reliability of each of the reference points based on at least one of the background data and the road width data at the position of the each of the reference points;

wherein, when the background data at the position of one of the reference points is a type corresponding to a forest, the predicted altitude reliability of the reference point is set to a first predetermined value that is less than a second predetermined value for the predicted altitude reliability when the background type is a type other than a forest.

8. The altitude reliability determining method according to claim 7, further comprising:

when determining the predicted altitude reliability of each of the reference points, adjusting the predicted altitude reliability on a scale in which the narrower the road width, the lower that the predicted altitude reliability is adjusted.

9. The altitude reliability determining method according to claim 7, further comprising:

correcting a predicted altitude associated with a specific reference point based on the predicted altitude of at least one reference point having the predicted altitude reliability being equal to or greater than a predetermined first reference value, the specific reference point having the predicted altitude reliability being smaller than the first reference value among the reference points.

10. The altitude reliability determining method according to claim 9, further comprising:

determining a border section being a section where the predicted altitude reliability of the reference point increases or decreases across the first reference value in an alignment sequence of the reference points along the road; and when the border section where the predicted altitude reliability decreases and the border section where the predicted altitude reliability increases exist in a pair within a predetermined correction determination distance, correcting the predicted altitudes of all of the specific reference points located between the pair of border sections so as to offset change amounts based on the respective change amounts of the predicted altitudes in the pair of border sections.

11. The altitude reliability determining method according to claim 7, further comprising:

executing a specific assistance process based on the predicted altitude, the specific assistance process being selected from a plurality of assistance processes relating to driving assistance of a vehicle;

extracting one or more executable assistance processes which are the assistance processes executable with the predicted altitude reliability; and selecting and executing one or more specific assistance processes from the extracted one or more executable assistance processes.

12. The altitude reliability determining method according to claim 11, wherein:

the plurality of assistance processes include a vehicle control assistance process to control vehicle behavior and a guidance assistance process to provide various kinds of information to an occupant of the vehicle, and a second reference value is set smaller than a third reference value, the second reference value being a threshold value of the predicted altitude reliability to determine the guidance assistance process as the executable assistance process, the third reference value being a threshold value of the predicted altitude reliability to determine the vehicle control assistance process as the executable assistance process.

13. A computer-readable storage medium storing a computer-executable altitude reliability determining program, the program comprising:

instructions for acquiring map information including road information and background information, the road information including road width data and the background information including background type data;

instructions for acquiring altitude information indicating an altitude of each unit region, the unit region being set by dividing a map indicated in the map information into a plurality of unit regions having a predetermined size;

instructions for calculating a predicted altitude of each of a plurality of reference points based on the road information and the altitude information, the plurality of reference points being set along a road;

instructions for accessing the road information and the background information at a position of each of the reference points; and instructions for determining a predicted altitude reliability of each of the reference points based on at least one of the background type data and the road width data at the position of the each of the reference points.

* * * * *